J. SCHMID.
LEVEL.
APPLICATION FILED MAR. 30, 1914.
1,134,162.
Patented Apr. 6, 1915.
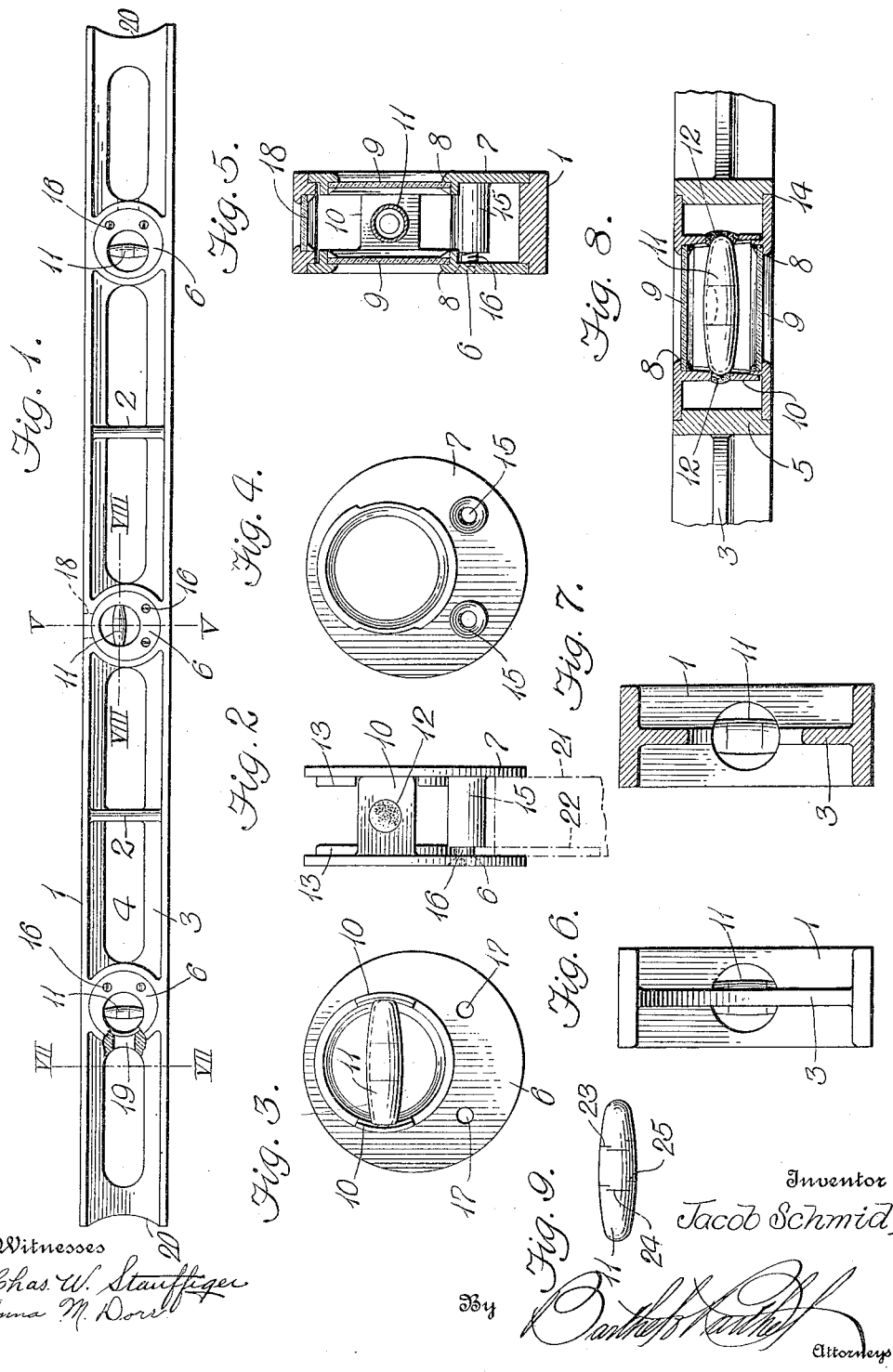
Witnesses
Chas. W. Stauffiger
Anna M. Dorr
Inventor
Jacob Schmid,
By
Attorneys

UNITED STATES PATENT OFFICE.

JACOB SCHMID, OF DETROIT, MICHIGAN.

LEVEL.

1,134,162.

Specification of Letters Patent.

Patented Apr. 6, 1915.

Application filed March 30, 1914. Serial No. 828,161.

*To all whom it may concern:*

Be it known that I, JACOB SCHMID, a citizen of the United States of America, residing at Detroit, in the county of Wayne and State of Michigan, have invented certain new and useful Improvements in Levels, of which the following is a specification, reference being had therein to the accompanying drawings.

This invention relates to levels, and the objects of my invention are, first, to furnish a level with a plurality of level glass units that can be adjusted and correctly positioned to permit of the level being used in various positions; second, to provide a level glass unit consisting of parts that can be assembled to retain the unit in engagement with a frame or other support, and third, to accomplish the above by a simple, durable and inexpensive mechanical construction that will be hereinafter specifically described and then claimed.

Reference will now be had to the drawing, wherein—

Figure 1 is a side elevation of the level; Fig. 2 is an edge view of a detached level glass unit; Fig. 3 is an elevation of one of the parts of the level glass unit; Fig. 4 is a similar view of the other part of the level glass unit; Fig. 5 is an enlarged cross sectional view taken on the line V—V of Fig. 1; Fig. 6 is an end view of the level; Fig. 7 is an enlarged cross sectional view taken on the line VI—VI of Fig. 1; Fig. 8 is an enlarged longitudinal sectional view of the level taken on the line VIII—VIII of Fig. 1, showing the level glass or tube in elevation, and Fig. 9 is a plan of a detached level glass or tube.

A level in accordance with this invention comprises an oblong metallic frame 1 having the top and bottom sides thereof connected by transverse ribs 2 and a central longitudinal web 3, which is provided with oblong openings 4. The frame 1, intermediate the ends thereof and at points adjacent to the ends of said frame, is provided with cylindrical housings 5 in which are detachably mounted level glass units that are identical in construction, but are differently positioned whereby the level can be used in various positions.

Each level glass unit comprises side plates 6 and 7 that are circular and have flanged eccentric openings 8 providing seats for transparent circular protecting plates 9 that are secured in the seats by putty, cement or other fastening means.

The inner side of the plate 6 has oppositely disposed lugs 10 constituting supports for a level glass 11 that has the central portion thereof a greater diameter than the remaining portions of said glass. The tube forming the level glass tapers from the central portion thereof to the ends which extend into openings 12 provided therefor in the lugs 10 and are held by a plaster of Paris or by other fastening means. The curvature or bulge of the tube or glass is such that the bubble therein can readily appear and move at either side of the tube or glass.

The lugs 10 extend between enlargements or protuberances 13 upon the inner side of the plate 7, thereby correctly positioning said plates to permit of the level glass 11 being observed through either of the protecting plates 9. To hold the plates 6 and 7 in proper relation and clamp the same in a housing 5, said housing is cylindrical and has the open ends thereof provided with circular seats 14 for the edges of the plates. The inner side of the plate 7 has bosses or socket members 15 to receive screws 16 that extend through openings 17 in the plate 6, said screws having the heads thereof flush or countersunk in the outer side of the plate 6. By tightening the screws 16 the plates 6 and 7 are clamped in the housing 5 and can be positioned whereby a level glass will be supported longitudinally of the frame 1, as shown intermediate the ends thereof, or with level glass disposed transversely of the frame, as shown at the ends thereof.

To permit of the central level glass being readily observed from the top of the frame, said frame and the central housing have registering oblong openings 18.

The end housings and the web 3 are provided with openings 19 to permit of the end level glasses being observed and the ends of the frame 1 are further cut away, as at 20, thus permitting of the end level glasses being observed from the ends of the frame.

By providing each unit with eccentric or off-set sight openings there is sufficient clearance for the fastening means connecting the side plates of the unit and the manner of clamping the side plates together permits of a unit being clamped upon a block 21, a square or straight edge 22 or any other structure. In the first instance, the block 21 is clamped between the plates 6 and 7 and in the latter instance the straight edge 22 is clamped between the side plates 6 and the ends of the bosses or socket members 15. It is therefore apparent that the bosses 15 are an essential element in connection with this invention.

As shown in detail in Fig. 9, the level glass or tube 11 is graduated or marked, as at 23, 24 and 25, the marks being in sets, one set for each side of the tube. These marks determine the central or level position of the bubble when the level is used in different positions.

While in the drawing there is illustrated a preferred embodiment of my invention, it is to be understood that the structural elements are susceptible of such variations and modifications as fall within the scope of the appended claims.

What I claim is:

1. The combination with a level frame and housings forming part thereof, of level glass units adjustably clamped in the housings of said frame, each unit comprising circular side plates provided with eccentric openings, oppositely disposed lugs carried by the inner side of one of said plates at diametrically opposed edges of the eccentric opening thereof, a level glass carried by said lugs, socket members protruding from the inner side of one of said plates, and screws extending through the other side plate into said members to detachably clamp said plate in engagement with the ends of the housings of said level frame.

2. A level glass unit comprising circular plates provided with eccentric openings, oppositely disposed lugs carried by the inner side of one of said plates at diametrically opposed edges of the eccentric opening thereof, enlargements forming part of the inner side of the other plate and between which extend the ends of said lugs for maintaining the eccentric openings of said plates in alinement, a level glass carried by said lugs and intercepting the axis of said eccentric openings, and means carried by said plates and correctly positioned by the interlocking of said lugs and said enlargements whereby said plates can be connected together.

3. The combination with a level frame and housings forming part thereof and having open ends provided with circular seats and side walls cut away to provide sight openings, of level glass units adjustably clamped in the seats in the ends of the housings of said frame whereby said level glass units can be positioned to be read through either of the sight openings of said housings, each unit comprising circular side plates provided with openings, interlocking means between said plates for correctly positioning one plate relative to the other, and a level glass supported by said locking means.

In testimony whereof I affix my signature in presence of two witnesses.

JACOB SCHMID.

Witnesses:
ANNA M. DORR,
OTTO F. BARTHEL.

Copies of this patent may be obtained for five cents each, by addressing the "Commissioner of Patents, Washington, D. C."